(12) United States Patent
Najmabadi et al.

(10) Patent No.: US 8,024,079 B2
(45) Date of Patent: Sep. 20, 2011

(54) WING-BODY LOAD ALLEVIATION FOR AIRCRAFT

(75) Inventors: Kioumars Najmabadi, Clyde Hill, WA (US); William F. Shivitz, Renton, WA (US); Edward Ernest Coleman, Forest Park, WA (US); John Koon-hung Ho, Shoreline, WA (US); Richard D. Johnson, Edmonds, WA (US); William F. Carver, Shoreline, WA (US); David W. Grubb, Monroe, WA (US); Robert James McIntosh, Bothell, WA (US)

(73) Assignee: The Boeing Company, Chicago, IL (US)

( * ) Notice: Subject to any disclaimer, the term of this patent is extended or adjusted under 35 U.S.C. 154(b) by 792 days.

(21) Appl. No.: 12/123,942

(22) Filed: May 20, 2008

(65) Prior Publication Data
US 2009/0292405 A1    Nov. 26, 2009

(51) Int. Cl.
G01C 23/00 (2006.01)
G06F 17/10 (2006.01)
B64C 3/58 (2006.01)

(52) U.S. Cl. ............... 701/3; 701/124; 244/49; 244/213

(58) Field of Classification Search ............... 701/3, 124; 244/36, 49, 87, 131, 120, 204, 208, 213, 244/215
See application file for complete search history.

(56) References Cited

U.S. PATENT DOCUMENTS

| | | | |
|---|---|---|---|
| 4,455,004 A | 6/1984 | Whitaker, Sr. | |
| 4,479,620 A | 10/1984 | Rogers et al. | |
| 4,651,955 A | 3/1987 | Krafka | |
| 4,725,020 A | 2/1988 | Whitener | |
| 4,796,192 A | 1/1989 | Lewis | |
| 4,821,981 A | 4/1989 | Gangsaas et al. | |
| 5,082,207 A | 1/1992 | Tulinius | |
| 5,135,186 A | 8/1992 | Ako | |
| 5,186,416 A | 2/1993 | Fabre et al. | |

(Continued)

FOREIGN PATENT DOCUMENTS
WO    2007006725 A1    1/2007

OTHER PUBLICATIONS

PCT International Search Report for application No. PCT/US2009/042398 dated Jun. 9, 2010.

(Continued)

*Primary Examiner* — Thomas Black
*Assistant Examiner* — Luke Huynh
(74) *Attorney, Agent, or Firm* — Yee & Associates, P.C.

(57) ABSTRACT

A computer implemented method, apparatus, and computer usable program product for symmetric and anti-symmetric control of aircraft flight control surfaces to reduce wing-body loads. Commands are sent to symmetrically deploy outboard control surfaces to shift wing air-loads inboard based on airplane state and speed brake deployment. Surface rate retraction on a wing with peak loads is limited to reduce maximum loads due to wheel checkback accompanied by utilization of opposite wing control surfaces to retain roll characteristics. Airloads are shifted inboard on a swept wing to move the center of pressure forward, thereby reducing the tail load required to perform a positive gravity maneuver. In a negative gravity maneuver, speed brakes are retracted, thereby reducing the positive tail load and reducing the aft body design loads. High gain feedback commands are filtered from wing structural modes above one hertz by a set of linear and non-linear filters.

20 Claims, 9 Drawing Sheets

U.S. PATENT DOCUMENTS

| | | | |
|---|---|---|---|
| 5,375,793 | A | 12/1994 | Rivron et al. |
| 5,375,794 | A | 12/1994 | Bleeg |
| 5,681,014 | A | 10/1997 | Palmer |
| 5,881,971 | A | 3/1999 | Hickman |
| 5,921,506 | A | 7/1999 | Appa |
| 6,161,801 | A | 12/2000 | Kelm et al. |
| 6,641,086 | B2 | 11/2003 | Clark |
| 6,729,579 | B1 | 5/2004 | Becker |
| 6,766,981 | B2 | 7/2004 | Volk |
| 6,772,979 | B2 | 8/2004 | Kubica et al. |
| 6,863,242 | B2 * | 3/2005 | Van De Kreeke et al. .... 244/7 R |
| 7,641,152 | B2 * | 1/2010 | Onu et al. ............... 244/194 |
| 2005/0242234 | A1 | 11/2005 | Mahmulyin |
| 2007/0114327 | A1 | 5/2007 | Dees et al. |

OTHER PUBLICATIONS

White, "Improving the Airplanr Efficiency by Use of Wing Maneuver Load Alleviation", Journal of Aircraft, vol. 8, No. 10, Oct. 1971, pp. 769-775.

Raymond et al., "Aircraft Flight Control Actuation System Design", Society of Automotive Engineers, Sep. 1993, pp. 102-106.

Ford, "Continuing Wing Production", Aircraft Engineering and Aerospace Technology, vol. 70, No. 1, 1998, p. 9-14.

* cited by examiner

WING-BODY LOAD ALLEVIATION FOR AIRCRAFT

BACKGROUND INFORMATION

1. Field

The present disclosure relates generally to aircraft and in particular to aircraft control surfaces. More particularly, the present disclosure is directed towards a computer implemented method, apparatus, and computer usable program product for manipulating control surfaces to reduce aircraft wing-body loads.

2. Background

Control surfaces, also referred to as flight controls or actuators, are airfoils that deflect air in one direction and cause an aircraft to move in the opposite direction. As used herein, an aircraft includes, without limitation, an airplane, a helicopter, a carrier, a commercial airliner, a sea plane, or any other type of aircraft.

Control surfaces are manipulated by pilots or by control laws to move an aircraft about its axes of motion and/or change an orientation of the aircraft. Control surfaces are frequently manipulated by using a control yoke, control stick and/or pedals, such as a rudder pedal. Control surfaces may also be manipulated by control laws and logic.

Control surfaces include, without limitation, ailerons, flaperons, rudders, spoilers, elevators, trim devices, and flaps. The ailerons, spoilers and flaperons are used to bank or roll an aircraft about the aircraft's longitudinal axis. The rudder yaws an aircraft about a vertical axis. The elevator moves an aircraft about the aircraft's lateral axis to change the aircraft's pitch attitude. Utilization of symmetric flaperons results in vertical motion of an aircraft.

Load factor is the ratio of total lift generated by an aircraft to the total weight of the aircraft. The lift is generated by the motion of air over the wing surface. Larger wings move more air over the wing surface. A larger wing relative to the wing mass will typically have a lower wing load. The wing load is generally expressed as acceleration due to gravity (g).

In straight and level flight, the total lift of an aircraft is equal to the total weight of the aircraft. In such a case, the load factor is one (1.0) gravity. When an aircraft is maneuvering, wing lift is diverted to performing the maneuver. Maneuvering may include turning, banking, changing pitch, inverting, and/or changing orientation. For example, when an aircraft performs a turn, the aircraft's lift vertical component, which is against gravity, is reduced and results in a descent. To compensate for the descent, the lift force is increased by increasing the wing angle, which results in an increase in drag. This results in an increase in the load on the wings.

Thus, the maneuverability of an aircraft may be limited by the wing size, the available engine power, and the maneuver load on the wings. Moreover, increases in maneuvering loads on the wings may increase fuel consumption and/or decrease flight speed.

SUMMARY

An embodiment of the present disclosure provides a computer implemented method, apparatus, and computer usable program product for symmetric and anti-symmetric control of aircraft flight control surfaces to reduce wing-body loads. Commands are sent to symmetrically deploy outboard control surfaces to shift wing air-loads inboard based on airplane state and speed brake deployment of an aircraft. Surface rate retraction on a wing with peak loads is limited to reduce maximum loads due to wheel checkback accompanied by utilization of opposite wing control surfaces to retain roll characteristics. The wing-body loads are reduced using the symmetric and anti-symmetric control of the flight control surfaces.

A pilot commanded rate of gravity change for commanded normal acceleration and aircraft rate of gravity change response are limited to acceptable magnitudes such that aircraft actuation systems and signal processing is able to deploy wing-body load alleviation control surfaces in accordance with prescribed schedules. In response to initiation of a positive gravity maneuver, airloads are shifted inboard on a swept wing to move the center of pressure forward, thereby reducing the tail load required to perform the positive gravity maneuver and reducing aft body design loads. In response to a negative gravity maneuver, speed brakes are retracted, thereby reducing the positive tail load and reducing the aft body design loads. High gain feedback commands are filtered from wing structural modes above one hertz by a set of linear and non-linear filters.

Another advantageous embodiment provides a computer program product for symmetric and anti-symmetric control of aircraft flight control surfaces to reduce loads. The computer program product comprises a computer readable medium. The program code stored on the computer readable medium sends commands to symmetrically deploy outboard control surfaces to shift wing air-loads inboard based on airplane state and speed brake deployment of an aircraft. The program code stored on the computer readable medium limits surface rate retraction on a wing with peak loads to reduce maximum loads due to wheel checkback accompanied by utilization of opposite wing control surfaces to retain roll characteristics. The wing-body loads are reduced using the symmetric and anti-symmetric control of the aircraft flight control surfaces.

The program code stored on the computer readable medium limits a pilot commanded rate of gravity change for commanded normal acceleration and aircraft rate of gravity change response to acceptable magnitudes such that aircraft actuation systems and signal processing deploys wing-body load alleviation control surfaces in accordance with prescribed schedules.

The program code stored on the computer readable medium shifts airloads inboard on a swept wing to move a center of pressure forward in response to initiation of a positive gravity maneuver. The tail load required to perform the positive gravity maneuver is reduced. The program code stored on the computer readable medium retracts speed brakes to reduce the positive tail load and aft body design loads during the negative gravity maneuver in response to initiation of a negative gravity maneuver. The program code stored on the computer readable medium filters out high gain feedback commands from wing structural modes above one hertz by a set of linear and non-linear filters.

In yet another advantageous embodiment, an aircraft is provided. The aircraft comprises a wing-body load alleviation control and logic, a set of speed brakes, and a set of filters. The wing-body load alleviation control and logic sends commands to symmetrically deploy outboard control surfaces to shift wing air-loads inboard based on airplane state and speed brake deployment of an aircraft; limit surface rate retraction on a wing with peak loads to reduce maximum loads due to wheel checkback accompanied by utilization of opposite wing control surfaces to retain roll characteristics; limits a pilot commanded rate of gravity change for commanded normal acceleration and aircraft rate of gravity change response to acceptable magnitudes such that aircraft actuation systems and signal processing deploys wing-body load alleviation control surfaces in accordance with prescribed schedules; shifts airloads inboard on a swept wing to move a center of pressure forward in response to initiation of a positive gravity maneuver to reduce the tail load required to perform the positive gravity maneuver; retracts at least one speed brake in the set of speed brakes to reduce the positive tail load and aft body design loads during the negative gravity maneuver in response to initiation of a negative gravity maneuver; and wherein the set of filters comprises linear and non-linear filters, and wherein the filters filter out high gain commands from wing structural modes above one hertz by a set of linear and non-linear filters.

Another advantageous embodiment provides an apparatus comprising: a bus system; a communications system connected to the bus system; a memory connected to the bus system, wherein the memory includes computer usable program code; and a processing unit connected to the bus system. The processing unit executes the computer usable program code to send commands to symmetrically deploy outboard control surfaces to shift wing air-loads inboard based on airplane state and speed brake deployment of an aircraft; limit surface rate retraction on a wing with peak loads to reduce maximum loads due to wheel checkback accompanied by utilization of opposite wing control surfaces to retain roll characteristics. The wing-body loads are reduced using the symmetric and anti-symmetric control of the aircraft flight control surfaces.

The processing unit executes the computer usable program code to limit a pilot commanded rate of gravity change for commanded normal acceleration and aircraft rate of gravity change response to acceptable magnitudes such that aircraft actuation systems and signal processing deploys wing-body load alleviation control surfaces in accordance with prescribed schedules; shift airloads inboard on a swept wing to move a center of pressure forward in response to initiation of a positive gravity maneuver. The tail load required to perform the positive gravity maneuver is reduced. The processing unit executes the computer usable program code to retract speed brakes to reduce the positive tail load and aft body design loads during the negative gravity maneuver in response to initiation of a negative gravity maneuver. The processing unit executes the computer usable program code to filter out high gain feedback commands from wing structural modes above one hertz by a set of linear and non-linear filters.

Thus, the advantageous embodiments solve the problem of reducing aircraft empty weight by reducing loads on airframe structures. The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
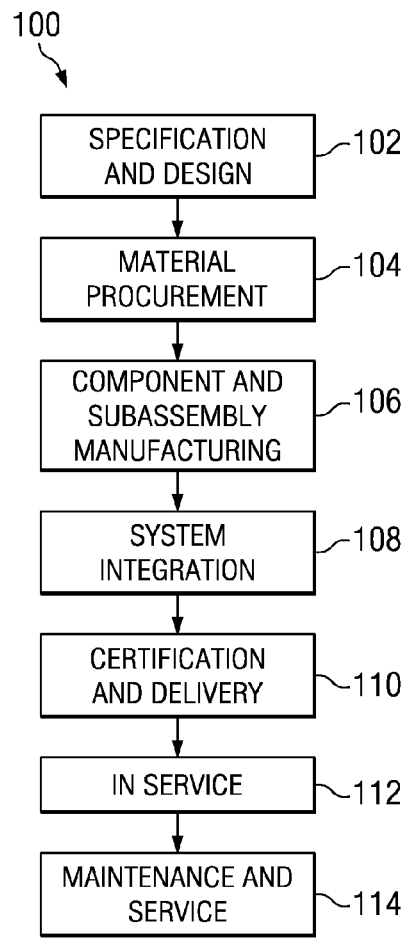
FIG. 1 is a block diagram of an aircraft manufacturing and service method in accordance with an advantageous embodiment.
Figure 2:
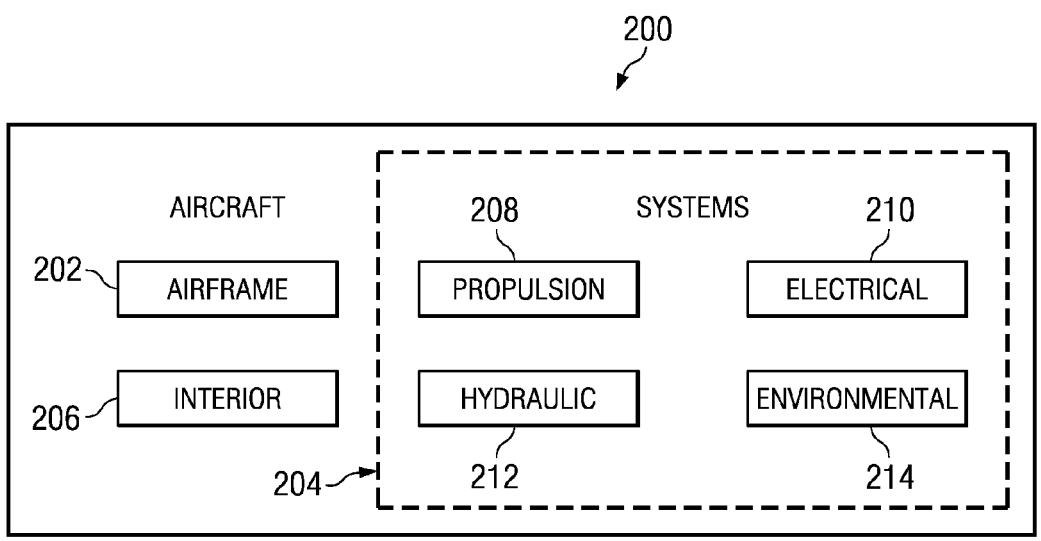
FIG. 2 is a block diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

An embodiment of the present disclosure provides a computer implemented method, apparatus, and computer usable program product for symmetric and anti-symmetric control of aircraft flight control surfaces to reduce wing-body loads in both pilot initiated maneuvers, as well as, wing-body loads caused by exogenous disturbance, such as wind gusts, when the aircraft is subject to both positive or negative acceleration.

In one embodiment, commands are sent to symmetrically deploy outboard control surfaces to shift wing air-loads inboard based on airplane states and speed brake deployment of an aircraft. If needed, the inboard spoilers are also retracted. Inboard surfaces are commanded to augment the lift capability as required. Steady state roll response is limited by the allowable roll command to reduce loads. Furthermore, to reduce load when wheel or stick is checked back at a high roll rate, surface position movements are rate limited on a wing with peak loads, and the opposite wing control surfaces are augmented to retain commanded roll response characteristics. Commands are filtered both by notch filters and a non-linear filter to reduce coupling and excitation of the structural modes. The non-linear filter uses a minimum/maximum (min/max) value during the preceding last second. Therefore high frequency signals are not passed through.

The nominal active control law is reconfigured and cross linked (command) from each of the deployed wing surfaces to reduce vertical and pitch transients caused by movement of the wing surfaces. The reduction in loads is active in both manual and auto flight modes, such as when an autopilot is being utilized.

The wing-body load alleviation control and logic may reduce allowable roll command to reduce airplane steady state and peak roll rate. In this embodiment, the pilot is limited on the amount of motion and roll that the pilot is permitted to induce in the aircraft.

In another embodiment, the wing-body load alleviation control and logic deploys a set of symmetric trailing edge control surfaces associated with a left wing and a right wing of the aircraft into a scheduled up or down position. The wing-body load alleviation control and logic may extend ailerons upward or downward; extend outboard spoilers upward and/or retract speed brake spoilers; retract inboard speed brake spoilers; and extend flaperons downward to provide direct lift.

In response to identifying a maneuver as a nominally encountered maneuver, the wing-body load alleviation control and logic may de-activate wing-body load alleviation function. In this example, the maneuver comprises at least one of nominal maneuvers initiated by a pilot and/or nominal maneuvers resulting from exogenous disturbances, such as gusts of wind or other forces external to the aircraft. The wing-body load alleviation control and logic may activate the wing-body load alleviation function throughout a maneuvering envelope. The maneuvering envelope may be a normal maneuvering envelope and a greater than nominal maneuvering envelope due to pilot commands or exogenous disturbances. The wing-body load alleviation functions of the control system are substantially transparent to maneuvering and handling qualities of the aircraft.

The wing-body load alleviation control and logic may reconfigure nominal control laws to counteract pitch and lift disturbances due to extension and retraction of wing mounted control surfaces. The wing-body load alleviation control and logic simultaneously provides direct cross-tie between the wing mounted control surfaces and elevator.

In response to a positive load on a wing, the wing-body load alleviation control and logic may retract inboard speed brakes associated with the wing to reduce wing and tail loads. In response to a negative maneuver load on a wing, the wing-body load alleviation control and logic may retract both inboard speed brakes and outboard speed brakes associated with the wing to reduce wing and tail loads. In this manner, the wing-body load alleviation provides load relief for load levels up to an ultimate load for both positive and negative gravity maneuver loads on the aircraft. An ultimate load is the maximum amount of load a structure can withstand without failure. The wing-body load alleviation control and logic may provide load relief for maneuver loads equal to ultimate loads for control surface configurations comprising both flaps down and flaps up configurations.

In another embodiment, the wing-body load alleviation control and logic selects a maximum between speed brake handle commands issued by a pilot and wing-body load alleviation commands issued by a wing-body load alleviation function to form a max select value. The wing-body load alleviation control and logic then extends the outboard spoilers using the max select value. Max select returns the maximum value of a function or expression.

The wing-body load alleviation control and logic may also synthesize a load factor at a center of gravity using inertial reference unit signals to estimate the load factor forward and aft of the wing. The inertial reference unit signals comprise body normal acceleration and body pitch acceleration. The wing-body load alleviation control and logic then performs a max select to capture the peak load factor at the center of gravity. The inertial reference unit signals are used as a driver to move the wing mounted surfaces and reconfigure the control laws.

The wing-body load alleviation control and logic may be active at any time during flight, including, without limitation, during manual pilot operations, auto pilot operations, and/or autoflight operations.

The set of filters remove higher frequency signals in the feedback command to the control surfaces by the set of linear filters and non-linear filters. In this embodiment, a non-linear filter uses a minimum value or a maximum value of its input for a preceding last second to provide output from the non-linear filter. The high frequency signals are not passed through the filter. The set of filters may also be used to block selected frequency signals using a moving time window associated with the set of linear filters and non-linear filters. In this example, the time variable is adjusted for a faster response time or to block higher frequencies. The time variable may be a function of aircraft state, flight conditions, structural modes frequencies, and aircraft weight.

Figure 3:
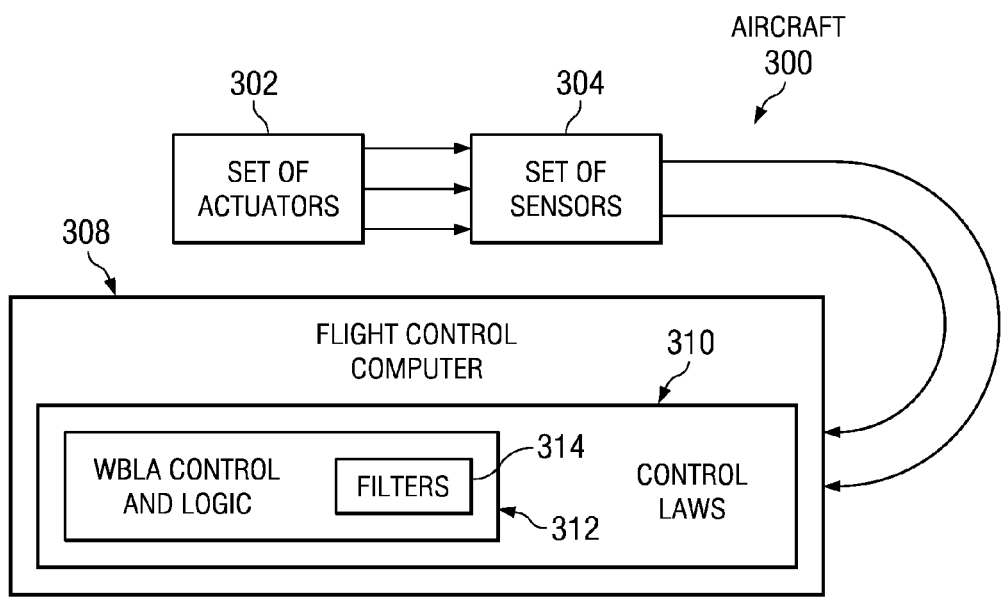
FIG. 3 is a block diagram of an aircraft having a wing-body load alleviation control and logic in accordance with an advantageous embodiment.

FIG. 3 is a block diagram of an aircraft having a wing-body alleviation control and logic in accordance with an advantageous embodiment. Aircraft 300 may be implemented as any type of aircraft, such as, without limitation, aircraft 200 in FIG. 2. For example, aircraft 300 may be implemented as, but without limitation, a Boeing 787.

Aircraft 300 includes set of actuators 302. Actuators are control surfaces used to control the orientation and movement of aircraft 300. Set of actuators 302 is a set of one or more control surfaces, such as, without limitation, elevators, flaps, ailerons, spoilers, flaperons, spoilerons, elevens, and/or tailerons.

Set of sensors 304 is a set of one or more sensors for sending input to flight control computer 308, such as, without limitation, air and/or inertial data. Air and/or inertial data may include, without limitation, body normal acceleration (Nz), body pitch rate (Q), and/or body roll rates (P).

Flight control computer 308 is a data processing system for implementing control laws 310. Flight control computer 308 may be, for example and without limitation, a flight control module line replaceable unit (LRU). Control laws 310 are implemented as normal mode pitch control laws. Control laws 310 comprises wing-body load alleviation (WBLA) control and logic 312 in accordance with this advantageous embodiment.

Wing-body load alleviation control and logic 312 is a software component that commands wing control surfaces to reduce maneuver loads on the wings of an aircraft. Wing-body load alleviation control and logic 312 is implemented within the normal pitch digital control logic of flight control computer 308. Wing-body load alleviation control and logic 312 uses the signals from set of sensors 304 to determine which commands to send, how to send commands, and when to send commands to move one or more control surfaces in set of actuators 302 to reduce the maneuver load on the wings of aircraft 300 during take off, flight, and/or landing.

In one embodiment, wing-body load alleviation control and logic 312 deflects the trailing edge of outboard wing control surfaces upward and deflects the trailing edge of inboard surfaces downward per a prescribed schedule to shift the air-loads inboard and thereby reduce spanwise wing bending moments. Wing-body load alleviation control and logic 312 performs a roll checkback load alleviation to reduce peak wing checkback loads caused by wing control surfaces that would normally retract rapidly when the wheel is centered at a high roll rate condition by rate limiting the surface retraction and compensating to retain the same airplane roll characteristics by deflecting the opposite wing control surfaces. Speed brakes are retracted at elevated and negative gravity (g) levels per prescribed schedules to reduce wing loads and balancing tail loads. Closed-loop feedback control to the elevators compensates for any pitch-up or instabilities caused by wing-body load alleviation wing control surface deployments.

A special non-linear filter on the wing-body load alleviation sensor path effectively blocks any frequencies above 1 hertz from feeding back through the wing-body load alleviation control surfaces and coupling with structural modes. A command gravity (g) rate limiter limits the wing-body load alleviation schedule gravity (g) rates such that the actuation systems can perform to the required deflection schedules of wing-body load alleviation control and logic 312.

Wing-body load alleviation filters 314 are filters that combine body pitch rate (Q) and estimation of normal acceleration (Nz) at the center of gravity (CG) of aircraft 300. Filters 314 may include, without limitation, one or more notch filters, linear filters, and/or non-linear filters. Notch filters minimize structural coupling and send commands to set of actuators 302 to manipulate the actuators to minimize vibrations. A non-linear filter minimizes feedback of structural frequencies.

Figure 4:
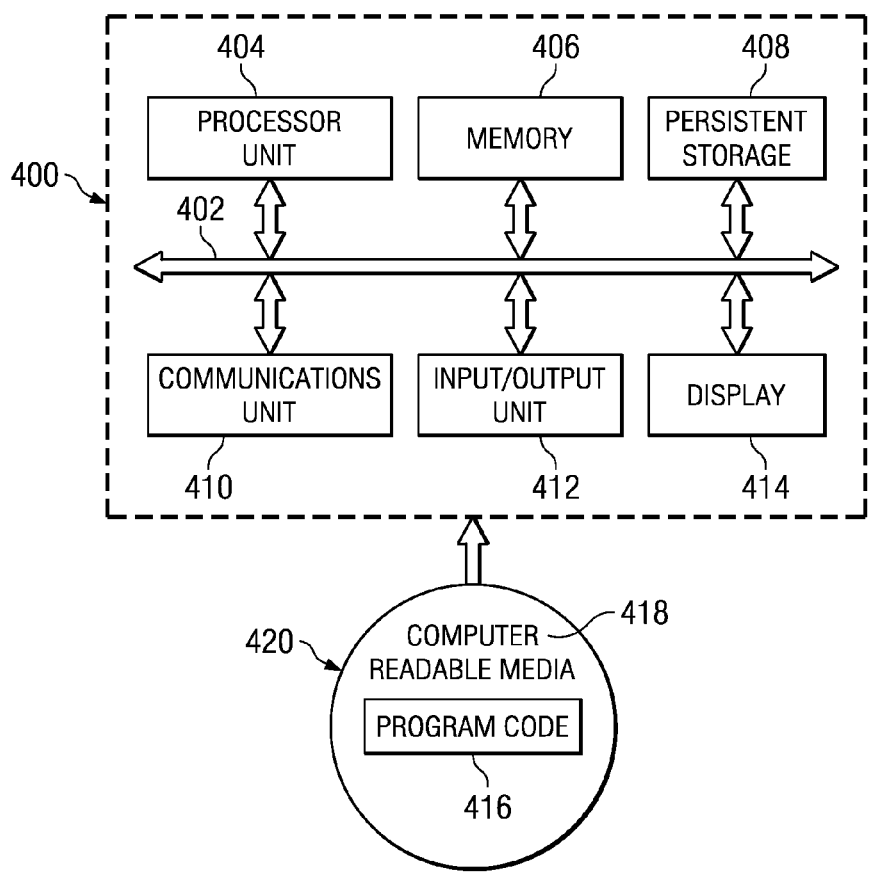
FIG. 4 is a block diagram of a data processing system for implementing a wing-body load alleviation control and logic in accordance with an advantageous embodiment.

Turning now to FIG. 4, a diagram of a data processing system for implementing wing-body load alleviation is depicted in accordance with an advantageous embodiment. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

As one example, a storage device in data processing system 400 is any hardware apparatus that may store data. Memory 406, persistent storage 408 and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
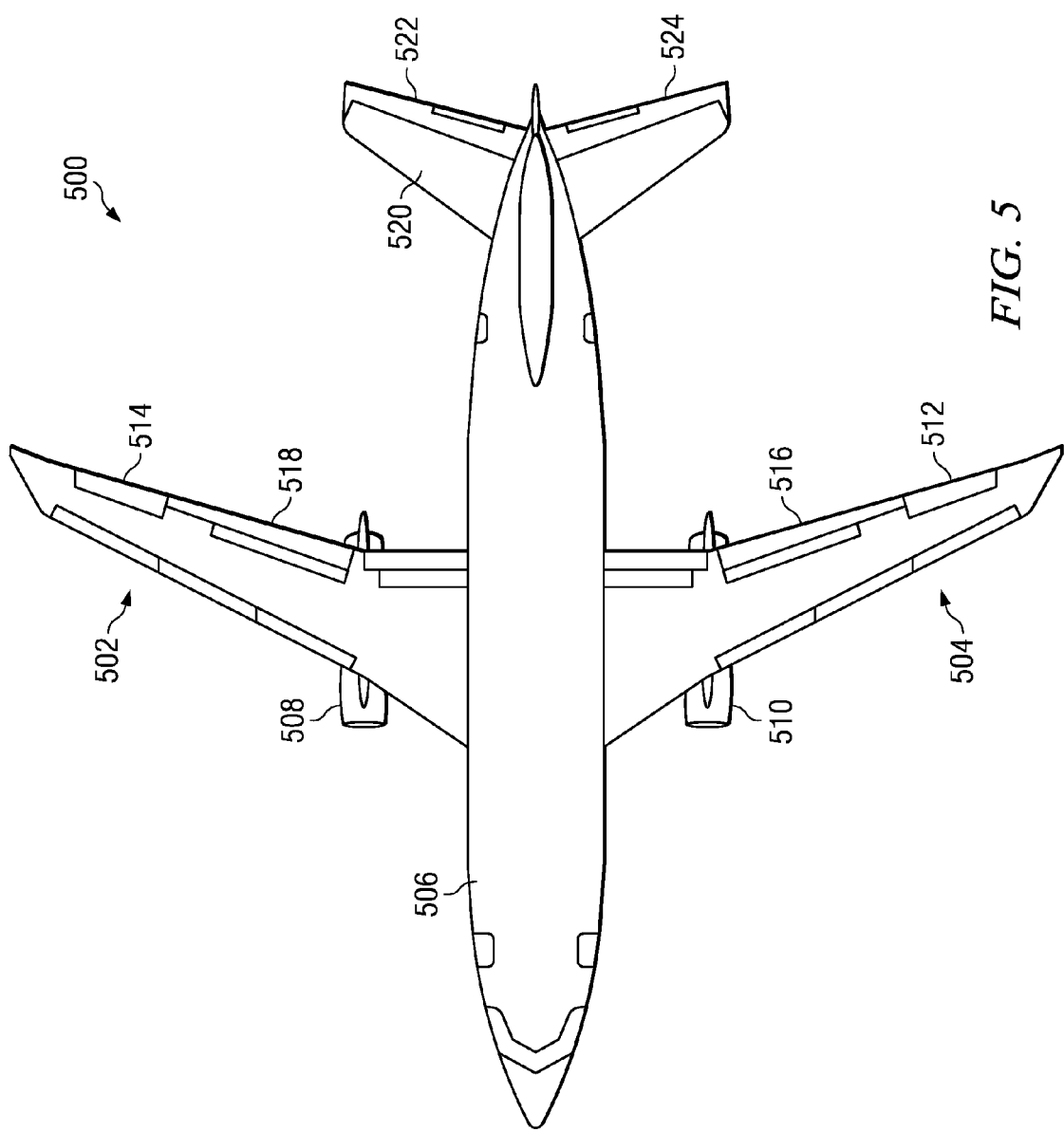
FIG. 5 is a block diagram of an aircraft having a set of actuators in accordance with an advantageous embodiment.

Turning now to FIG. 5, a block diagram of an aircraft having a set of actuators is depicted in accordance with an advantageous embodiment. Aircraft 500 is an example of an aircraft, such as aircraft 200 in FIG. 2 or aircraft 300 in FIG. 3. In this illustrative example, aircraft 500 has wings 502 and 504 attached to body 506. Body 506 includes the fuselage of aircraft 500. Aircraft 500 includes wing mounted engine 508, wing mounted engine 510, and tail 520.

Aircraft 500 also includes a set of control surfaces, such as, without limitation, left wing aileron 512, right wing aileron 514, left wing outboard spoilers and inboard spoilers 516, right wing outboard spoilers and inboard spoilers 518, right elevator 522, and left elevator 524. Left wing aileron 512 and right wing aileron 514 are hinged control surfaces attached to the trailing edge of the left wing and right wing respectively. When one aileron goes up, the other aileron typically goes down to create a roll in aircraft 500. For example, left wing aileron 512 goes downward to increase the lift on left wing 502 while right wing aileron 514 moves upward to reduce the lift on right wing 504 to produce a roll about the longitudinal axis of aircraft 500.

A spoiler, such as left wing outboard spoilers and inboard spoilers 516 and right wing outboard spoilers and inboard spoilers 518, is a device on the top surface of a wing that can be extended upward into the airflow to create a reduction of the lift of the section of the wing associated with the spoiler. An inboard spoiler is a spoiler located on a section of the wing that is near the body or fuselage of aircraft 500. An outboard spoiler is a spoiler located on a section of a wing that is located away from the body or fuselage of aircraft 500.

Right elevator 522 and left elevator 524 are control surfaces at the rear of aircraft 500. Right elevator 522 and left elevator 524 control the orientation of aircraft 500 by changing the pitch of aircraft 500. When an elevator moves up, tail 520 moves downward and the nose moves upward. When an elevator moves down, tail 520 moves upward and the nose lowers.

Aircraft 500 may include additional control surfaces not shown in FIG. 5. For example, aircraft 500 may include one or more flaperons, spoilerons, elevons, and/or tailerons. A flaperon is a control surface that combines an aileron and a flap. A spoileron is a spoiler used in conjunction with ailerons. An elevon is an aileron combined with elevators. A taileron is a control surface on a tail of aircraft 500 that enables roll control.

Moreover, aircraft 500 is not required to include all of the control surfaces shown in FIG. 5 in the same configuration shown in FIG. 5. In other words, aircraft 500 may include fewer control surfaces, additional different control surfaces, and/or one or more control surfaces shown in FIG. 5 with modifications to the control surfaces. Finally, aircraft 500 may also include sensors (not shown) for sending input to a flight control computer, such as set of sensors 304 in FIG. 3.

Figure 6:
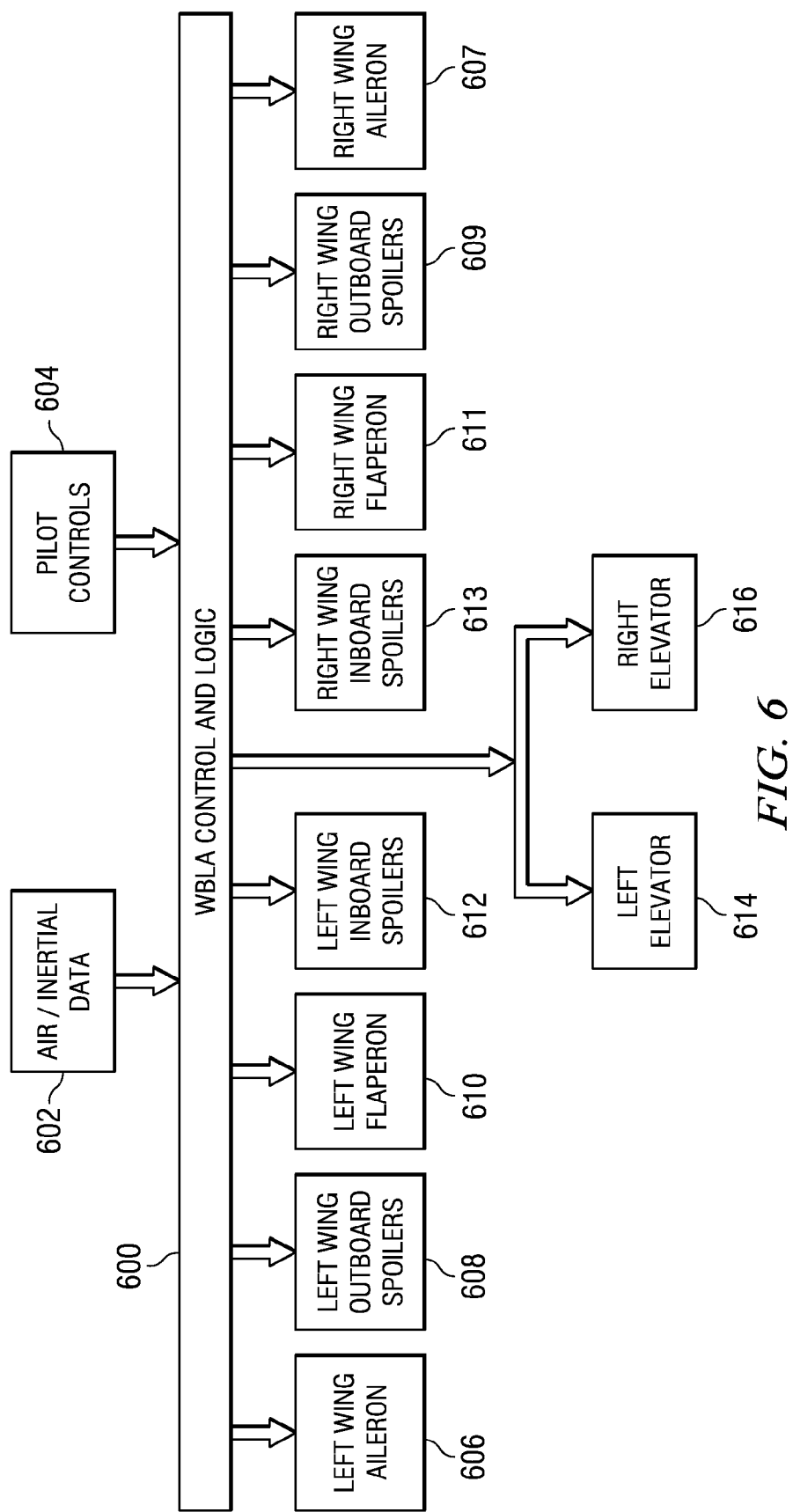
FIG. 6 is a block diagram of wing-body load alleviation control and logic in accordance with an advantageous embodiment.

FIG. 6 is a block diagram of a wing-body load alleviation control and logic in accordance with an advantageous embodiment. Wing-body load alleviation (WBLA) control and logic 600 is software for controlling actuators to alleviate the maneuver load on wings of an aircraft, such as wing-body load alleviation control and logic 312 in FIG. 3.

Wing-body load alleviation control and logic 600 receives air and inertial data 602 from a set of sensors associated with the aircraft, such as set of sensors 304 in FIG. 3. Wing-body load alleviation control and logic 600 also receives input from pilot controls 604. Wing-body load alleviation control and logic 600 sends commands to one or more control surfaces in the set of control surfaces on the aircraft to reduce the maneuver load on the wings of the aircraft. In this example, wing-body load alleviation control and logic 600 controls left wing aileron 606, right wing aileron 607, left wing outboard spoilers 608, right wing outboard spoilers 609, left wing flaperon 610, right wing flaperon 611, left wing inboard spoilers 612, and right wing inboard spoilers 613 associated with the left and right wings respectively. Wing-body load alleviation control and logic 600 also sends instructions to left elevator 614 and right elevator 616 associated with the tail of the aircraft to manipulate the elevators to support wing-body load alleviation.

During positive gravity maneuver load situations, wing-body load alleviation control and logic 600 raises symmetric trailing edge control surfaces, such as outboard spoilers and ailerons on both the left and right wings. Wing-body load alleviation control and logic 600 also symmetrically lowers flaperons on the left and right wing to create inboard direct lift. Wing-body load alleviation control and logic 600 also symmetrically retract inboard speed brakes (spoilers) on the left and right wings to shift wing air loads inboard and reduce aft body loads. If a negative gravity maneuver load occurs, the wing-body load alleviation control and load 600 may retract both inboard and outboard speed brakes to reduce wing and tail loads.

In this embodiment, wing-body load alleviation control and logic 600 reduces symmetric wing bending moments by shifting air-loads inboard. Wing-body load alleviation control and logic 600 reduces wing and balancing tail loads by retracting speed brakes. Wing-body load alleviation control and logic 600 reduces peak wing loads that result from high roll-rate wheel checkback control inputs per specified control schedules that are mainly a function of normal load factor and roll rate with some flap position dependency.

Pitch control laws, such as control laws 310 in FIG. 3, add feedback damping to partially compensate for wing-body load alleviation lift and pitching moment changes implemented by wing-body load alleviation control and logic 312. Direct feedback and cross feedback to elevators compensate for maneuver and load lift and pitching moment changes. In other words, as the wing-body load alleviation becomes active, feedback and cross feed may occur as one or more control surfaces are moving on the wings. The wing-body load alleviation uses the cross feeds across the surface to the elevator to compensate for any undesirable side effects generated by the wing-body load alleviation manipulation of control surfaces.

Wing-body load alleviation control and logic 600 may send instructions to additional control surfaces not shown in FIG. 6. In addition, wing-body load alleviation control and logic 600 is not required to send instructions to all of the control surfaces shown in FIG. 6. For example, the aircraft associated with wing-body load alleviation control and logic 600 may include spoilers, flaps, and elevators but not flaperons.

Figure 7:
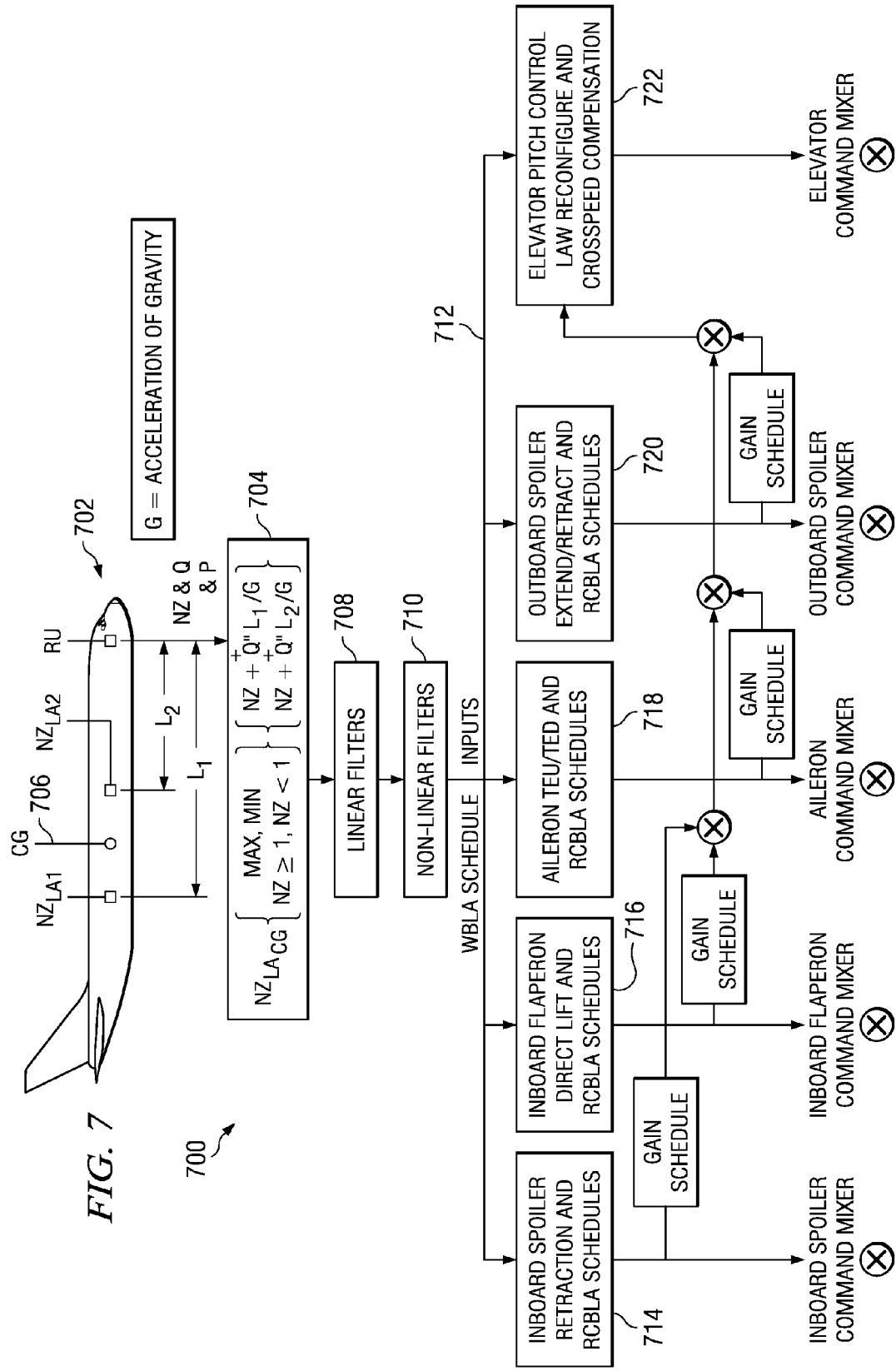
FIG. 7 is a functional schematic diagram of wing-body load alleviation control and logic in accordance with an advantageous embodiment.

FIG. 7 is a functional schematic diagram of wing-body load alleviation control and logic in accordance with an advantageous embodiment. Functional schematic 700 illustrates wing-body load alleviation for aircraft 702. Synthesized body normal acceleration 704 is a body normal acceleration of aircraft 702 at center of gravity 706 due to both pilot commands and atmospheric disturbances.

Linear filters 708 include, without limitation, notch filters to minimize structural coupling. Linear filters 708 and non-linear filters 710 filter out or minimize high gain feedback commands from wing structural modes above one hertz. The feedback dampening partially compensates for load alleviation lift and pitching moment changes. In one embodiment, a moving time window associated with the set of linear filters and non-linear filters is used to block selected frequency signals. The time can be adjusted for a faster response time or to block higher frequencies. The time is a function of aircraft state, flight conditions, structural modes frequencies, and aircraft weight.

Wing-body load alleviation schedule inputs are schedules for extending and retracting control surfaces to reduce loads on the wings of an aircraft. Wing-body load alleviation schedule inputs include inboard spoiler retraction and roll checkback load alleviation (RCBLA) schedules 714, inboard flaperon direct lift and roll checkback load alleviation 716, aileron trailing edge up (TEU)/trailing edge down (TED) direct lift & roll checkback load alleviation schedules 718, outboard spoiler extend/retract & roll checkback load alleviation schedules 720, and elevator pitch control law reconfigure & crossfeed compensation 722. The wing body load alleviation schedules may be based on a combination of airplane dynamics, airplane state, and airplane payload.

Inboard spoiler retraction and roll checkback load alleviation schedules 714 include schedules for retracting inboard spoilers during positive gravity maneuvers and negative gravity maneuvers. The roll checkback load alleviation reduces peak wing loads.

Inboard flaperon direct lift and roll checkback load alleviation schedules 716 includes one or more schedules for commanding inboard flaperons to deflect trailing edge down for direct lift to shift the center of lift inboard.

Aileron TEU/TED and roll checkback load alleviation schedules 718 includes one or more schedules for commanding ailerons symmetric trailing edge up deployment (TEU) or symmetric trailing edge down (TED) deployment to decrease lift on an outboard wing to reduce bending moments inboard.

Outboard spoiler extend/retract and roll checkback load alleviation schedules 720 includes one or more schedules for commanding outboard spoilers to extend and/or retract to reduce bending moments inboard.

Elevator pitch control law reconfigure and crossfeed compensation 722 includes schedules for feedback and crossfeed to one or more elevators to compensate for load alleviation induced lift and pitching moment changes.

Figure 8:
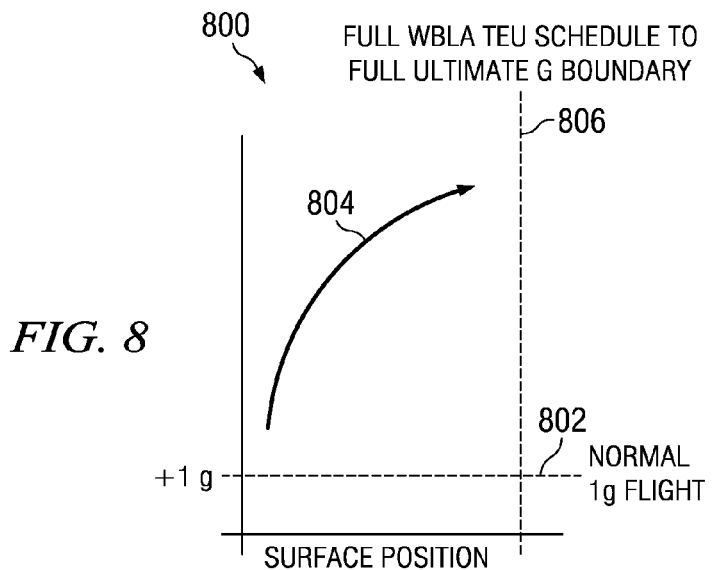
FIG. 8 is a graph illustrating maneuver load acceleration on an aircraft.

Referring now to FIG. 8, a graph illustrating maneuver load acceleration on an aircraft is shown. Graph 800 is a graph showing wing-body load acceleration due to changes in a position of an aircraft during flight. Load factor is the ratio of total lift generated by an aircraft to the total weight of the aircraft. Wings generate lift by the motion of air over the wings. The larger the wings, the greater the amount of air moving over the wings and the greater the amount of lift.

The wing load factor is typically expressed in multiples of acceleration due to gravity (g). The wing load factor may be a positive or a negative value. The wing load may be used to determine the general maneuverability of an aircraft. An aircraft with a lower wing load is able to take off and land at lower speeds, using less fuel, and/or carrying greater loads than an aircraft with a higher wing load. An aircraft with a lower wing load may also have a faster climb rate and a more fuel efficient cruising performance because less thrust and, correspondingly less fuel, is required to maintain lift for level flight.

In straight and level flight, the total lift of an aircraft is equal to the total weight of the aircraft. This results in a load factor of one (1.0) gravity (g) at line 802. When an aircraft is turning, maneuvering, changing pitch, inverting, and/or otherwise changing orientation, the load on the wings may increase to greater than one gravity or decrease to less than one gravity. In other words, the maneuver load may be positive or negative.

In graph 800, the load rate is increasing and the corresponding utilization of wing-body load alleviation (WBLA) methods are also increased to reduce the maneuver load on the wings at line 804. At line 806, the full schedule of wing-body load alleviation is used to minimize the maneuver load on the wings.

Figure 9:
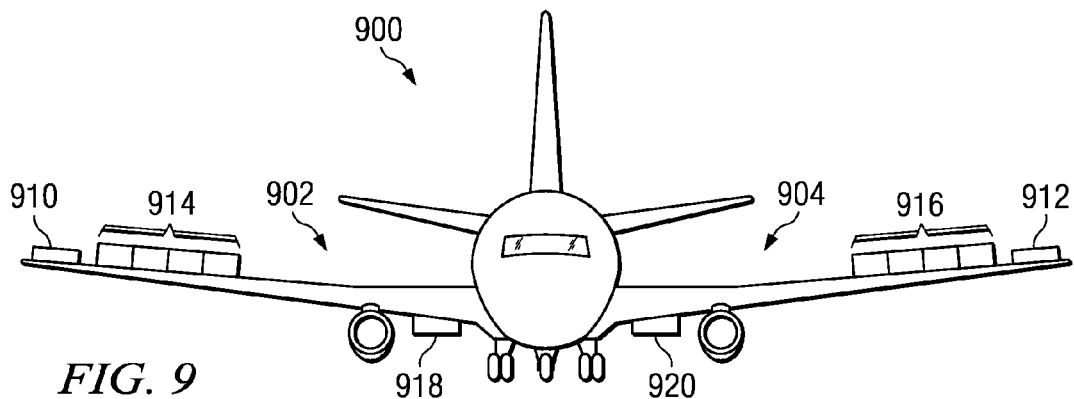
FIG. 9 is a block diagram of an aircraft having outboard spoilers extended, ailerons commanded up, and inboard flaperons commanded down in accordance with an advantageous embodiment.

FIG. 9 is a block diagram of an aircraft having outboard spoilers extended, ailerons commanded up, and inboard flaperons commanded down in accordance with an advantageous embodiment. Aircraft 900 is an aircraft such as aircraft 200 in FIG. 2, aircraft 300 in FIG. 3 or aircraft 500 in FIG. 5.

Aircraft 900 is associated with a positive maneuver load due to one or more maneuvers being performed by aircraft 900. The maneuvers may be due to either the pilot's initiated maneuvers or movements of aircraft 900 caused by exogenous disturbances. The wing-body load alleviation control and logic raises symmetric trailing edge control surfaces, such as ailerons and outboard spoilers, to shift wing air-loads inboard. Right wing aileron 910 and left wing aileron 912 are raised in an up position. Right outboard spoilers 914 and left wing outboard spoilers 916 are also deployed in an up position. Right wing flaperon 918 and left wing flaperon 920 are deployed in a down position to create direct lift. Inboard speedbrake spoilers 902 and 904 are not deployed. This decreases lift on the outboard wing and reduces bending moment inboard. Pitch control laws reconfigure to compensate for delta lift and pitching moment. In this manner, the wing-body load alleviation reduces wing loads during high gravity maneuvers. Right wing inboard flaperon 918 and left wing inboard flaperon 920 are deflected downward to create direct lift and thereby generate increased lift and shift air-loads further inboard.

Figure 10:
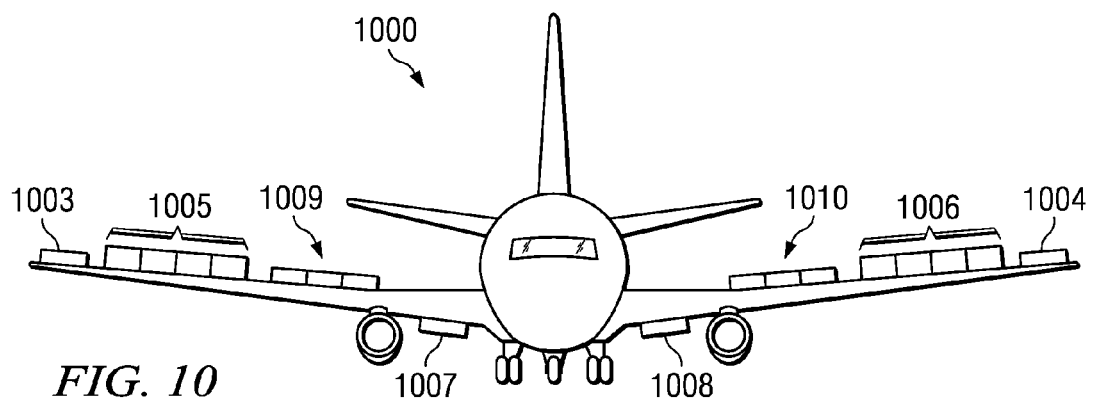
FIG. 10 is a block diagram of an aircraft with speed brakes extended, max select of speedbrake handle command, and wing-body load alleviation command for outboard panels and inboard panels retracted in accordance with an advantageous embodiment.

FIG. 10 is a block diagram of an aircraft with speed brakes extended, max select of speed brake handle command, and wing-body load alleviation command for outboard panels and inboard panels being retracted in accordance with an advantageous embodiment. Aircraft 1000 is an aircraft such as aircraft 200 in FIG. 2, aircraft 300 in FIG. 3 or aircraft 500 in FIG. 5. Aircraft 1000 is performing high gravity maneuvers. The wing-body load alleviation commands right wing aileron 1003, left wing aileron 1004, right wing outboard spoilers 1005, and left wing outboard spoilers 1006 into a raised up position and right wing flaperon 1007 and left wing flaperon 1008 are deflected downward to decrease lift on the outboard wings moving the center of lift more inboard. The wing-body load alleviation retracts inboard speed brakes 1009 and 1010 to shift air-loads inboard.

Figure 11:
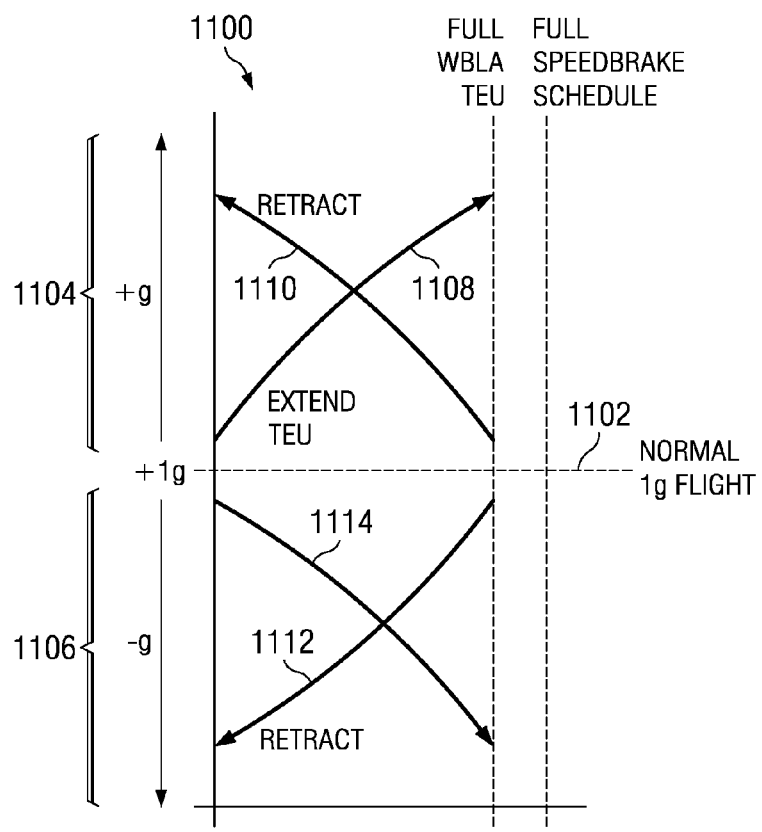
FIG. 11 is a graph of an acceleration and surface position of an aircraft while ascending and descending in accordance with an advantageous embodiment.

Turning now to FIG. 11, a graph of an acceleration and surface position of an aircraft while ascending and descending is depicted in accordance with an advantageous embodiment. During steady and level flight, an aircraft typically experiences a load of a single gravity (1.0 g), as shown at line 1102. A maneuver load may be a positive gravity maneuver load 1104 or a negative gravity maneuver load 1106. A positive maneuver load may occur when an aircraft ascends or otherwise maneuvers during flight. During positive gravity maneuver loads, ailerons and outboard spoilers are commanded up to decrease lift on the outboard wing as shown at line 1108. A maximum of speed brakes and spoilers on the outboard wing are selected. Inboard speed brakes are retracted to shift airloads inboard, as shown at line 1110. Inboard flaperons deflect downward for direct lift.

A maneuver load with a negative gravity may occur where an aircraft is descending. A wing-body load alleviation control and logic may be used to reduce the maneuver load during both negative gravity maneuver loads, as well as positive gravity maneuver loads. During a negative gravity maneuver load, the wing-body load alleviation retracts all speed brakes, including both inboard and outboard speed brakes, to reduce wing and tail loads, as shown at line 1112. During negative gravity maneuvers, the wing-body load alleviation may also initiate symmetric trailing edge up flaperon deployment for inboard direct lift to shift the center of lift inboard and reduce wing bending moments, as shown at line 1114.

The aircraft commanded roll is rate limited to reduce steady roll rate loads. The wing-body load alleviation system applies roll checkback load alleviation (RCBLA) to reduce peak wing loads.

Figure 12:
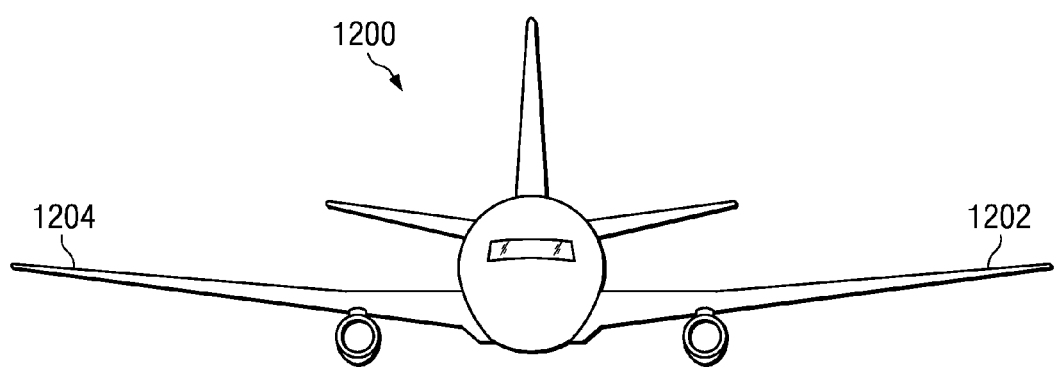
FIG. 12 is a block diagram of an aircraft in a normal state with a zero roll rate in accordance with an advantageous embodiment.

FIG. 12 is a block diagram of an aircraft in a normal state with a zero roll rate in accordance with an advantageous embodiment. Airplane 1200 is an aircraft such as aircraft 200 in FIG. 2, aircraft 300 in FIG. 3 or aircraft 500 in FIG. 5. Aircraft 1200 is in steady state flight. No maneuvers are being performed. Left wing 1202 and right wing 1204 are level. Because aircraft 1200 is in straight and level flight, the total lift of aircraft 1200 is equal to the total weight of aircraft 1200. In such a case, the load factor is one (1.0) gravity. The wing-body load alleviation system applies roll checkback load alleviation to reduce peak wing loads. The aircraft commanded roll is also rate limited to reduce steady roll rate loads.

Figure 13:
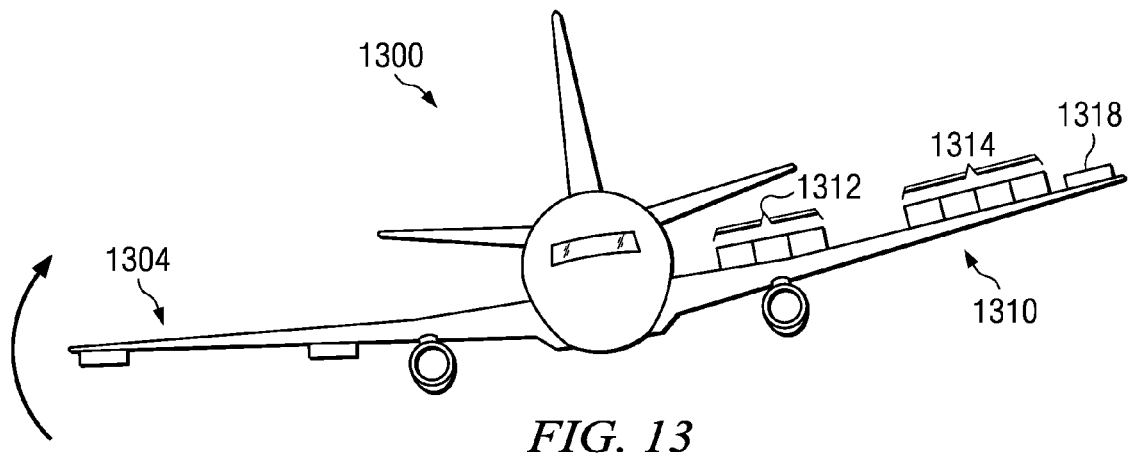
FIG. 13 is a block diagram of an aircraft at the beginning of a high roll rate maneuver to the left in accordance with an advantageous embodiment.

FIG. 13 is a block diagram of an aircraft at the beginning of a high roll rate maneuver to the left in accordance with an advantageous embodiment. Aircraft 1300 is an aircraft such as aircraft 200 in FIG. 2, aircraft 300 in FIG. 3, aircraft 500 in FIG. 5, or aircraft 1100 in FIG. 11. Aircraft 1300 is trimmed at a right banking maneuver.

When aircraft 1300 begins to perform a left turn or left banking maneuver, aircraft 1300 banks first to the right and then banks to the left to create sufficient banking angle to achieve the highest roll rate. Thus, the pilot applies a full wheel or full stick to roll aircraft 1300 to bank left at high roll rate. This input is followed by abruptly centering the wheel or stick. Therefore, aircraft 1300 in FIG. 13 is shown banked or tilted downward on the right at the beginning of the left banking maneuver. When aircraft 1300 is at the highest roll rate, the pilot checks back the wheel to stop the roll rate 1300.

Without wing-body load alleviation, as in the prior art, the load on the down-going left wing 1310 is increased significantly. The wing-body load alleviation, in accordance with this advantageous embodiment, rate-limits control surfaces on the down-going left wing 1310 and retracts those control surfaces more slowly than what would have occurred without wing-body load alleviation. The deflections of the control surfaces on up-going right wing 1304 are augmented by the difference between the rate limited and un-rate limited command for the down going wing control surfaces and hence provide the command roll characteristics. For example, left aileron 1318 and left spoilers 1312 and 1314 are lowered from the upward position shown in FIG. 13 into a downward position in a rate-limited manner resulting in a slower retraction of those control surfaces.

Figure 14:
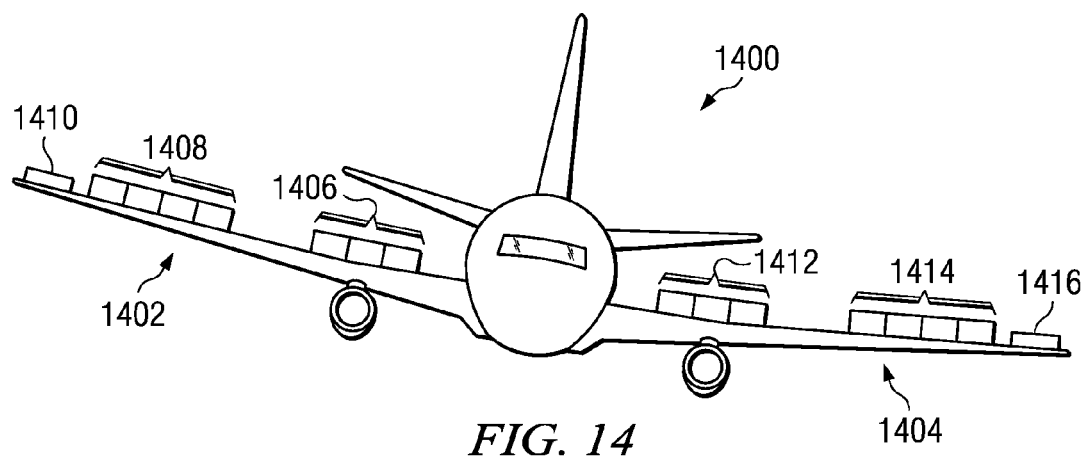
FIG. 14 is a block diagram of an aircraft during the high roll rate maneuver to the left and the wheel being checked back in accordance with an advantageous embodiment.

FIG. 14 is a block diagram of an aircraft during the high roll rate maneuver to the left and the wheel being checked back in accordance with an advantageous embodiment. Aircraft 1400 is an aircraft such as aircraft 200 in FIG. 2, aircraft 300 in FIG. 3, aircraft 500 in FIG. 5, aircraft 1100 in FIG. 11, or aircraft 1200 in FIG. 12. Aircraft 1400 is an aircraft that is at an intermediate point during a left banking maneuver, such as aircraft 1100 in FIG. 11 performing a left banking maneuver.

During the left banking maneuver, aircraft 1400 is first banked to the right and then banked to the left to generate a sufficiently high roll rate. When aircraft 1400 is at its highest roll rate, the pilot checks back the wheel or stick to stop the roll rate and to level the aircraft 1400, as shown in FIG. 14. When the wheel or stick is checked back, the control surfaces on up-going right wing 1402, such as right inboard spoilers 1406, the right flaperon, right outboard spoilers 1408, and right aileron 1410, are extended to retain the commanded roll rate characteristics. The extension of the surfaces on right wing 1402 is increased equal to the reduction imposed on the down going wing control surfaces such that maximum load is reduced while retaining commanded roll characteristics.

After returning to zero roll rate, wing surfaces are faired and peak loads are reduced by avoiding simultaneous high roll rate with faired surfaces on the down-going wing. In other words, as aircraft 1400 roll rate is arrested, the control surfaces on down-going left wing 1404, such as left inboard spoilers 1412, left outboard spoilers 1414, and left aileron 1416 are retracted slowly by a rate limiter and schedule to decrease the load on the down-going wing. The commands to the right wing, up-going wing, such as, right inboard spoilers 1406, right outboard spoilers 1408, and right aileron 1410, are augmented upward to compensate for the slowing retractions on the left wing to allow the aircraft to follow the commanded roll rate.

Figure 15:
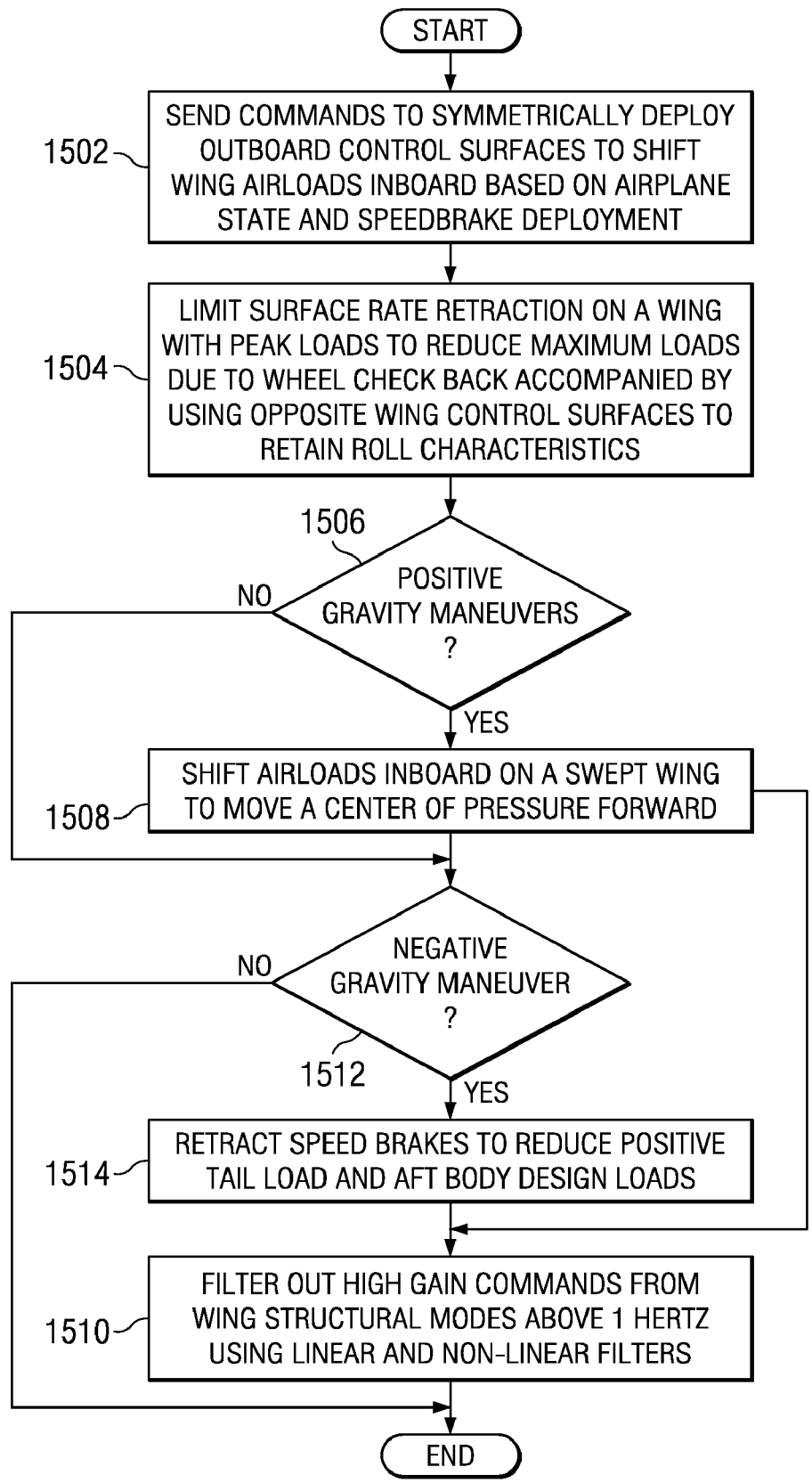
FIG. 15 is a flowchart illustrating a process for symmetric and anti-symmetric control of aircraft flight control surfaces to reduce maneuver loads in accordance with an advantageous embodiment.

FIG. 15 is a flowchart illustrating a process for symmetric and anti-symmetric control of aircraft flight control surfaces to reduce maneuver loads in accordance with an advantageous embodiment. The process is implemented by software for reducing maneuver loads, such as wing-body load alleviation logic and control 312 in FIG. 3.

Commands to symmetrically deploy outboard control surfaces to shift wing airloads inboard based on airplane state and speed brake deployment of an aircraft are sent to a set of control surfaces (operation 1502). Surface rate retraction on a wing with peak loads is limited to reduce maximum loads due to wheel checkback accompanied by using opposite wing control surfaces to retail roll characteristics (operation 1504).

A determination is made as to whether positive gravity maneuvers are being performed (operation 1506). If positive gravity maneuvers are being performed, airloads are shifted inboard on a swept wing to move a center of pressure forward (operation 1508). The tail load required to perform the positive gravity maneuver is thereby reduced. High gain commands from wing structural modes above one hertz are filtered out using linear and non-linear filters (operation 1510) with the process terminating thereafter.

Returning to operation 1506, if a positive gravity maneuver is not being performed, a determination is made as to whether a negative gravity maneuver is being performed (operation 1512). If a positive gravity maneuver is not being performed, the process terminates thereafter. In response to a negative gravity maneuver being performed at operation 1512, speed brakes are retracted to reduce positive tail load and aft body design loads during the negative gravity maneuver (operation 1514). High gain commands from wing structural modes above one hertz are filtered out using linear and non-linear filters (operation 1510) with the process terminating thereafter.

The process shown in FIG. 15 does not require that every operation shown in FIG. 15 be performed in exactly the same order shown in FIG. 15. The operations may be performed in a different order than the order shown in FIG. 15 or one or more operations may be omitted. In addition, two or more operations shown in FIG. 15 may be implemented substantially as a single step.

Thus, one embodiment of the present disclosure provides a computer implemented method, apparatus, and computer usable program product for symmetric and anti-symmetric control of aircraft flight control surfaces to reduce wing-body loads. Commands are sent to symmetrically deploy outboard control surfaces to shift wing air-loads inboard based on airplane state and speed brake deployment of an aircraft. Surface rate retraction on a wing with peak loads is limited to reduce maximum loads due to wheel checkback accompanied by utilization of opposite wing control surfaces to retain roll characteristics. The wing-body loads are reduced using the symmetric and anti-symmetric control of the wing control surfaces.

In response to initiation of a positive gravity maneuver, airloads are shifted inboard on a swept wing to move the center of pressure forward, thereby reducing the tail load required to perform the positive gravity maneuver and reducing aft body design loads.

In response to a negative gravity maneuver, speed brakes are retracted, thereby reducing the positive tail load and reducing the aft body design loads. High gain feedback commands are filtered from wing structural modes above one hertz by a set of linear and non-linear filters. Thus, the advantageous embodiments solve the problem of reducing aircraft empty weight by reducing designing loads on airframe structures.

During high normal acceleration maneuvers, the rate of change of the pilot's pitch axis commands are regulated to control the rate of change of normal accelerations away from the airplane one (1.0) gravity state, but does not limit acceleration of the aircraft during maneuvers as commanded by the pilot. Such regulation allows aircraft actuation systems and signal processing to deploy wing-body load alleviation control surfaces in accordance with prescribed schedules. Pilot roll commands are limited to reduce airplane steady state and peak roll rate and thereby reduce associated peak wing and body loads.

The wing-body load alleviation control and logic commands wing control surfaces to reduce airplane maneuver loads without adversely affecting airplane performance or flying qualities while maintaining structural safety during normal and extreme maneuvers. The wing-body load alleviation control and logic reduces maneuver loads without adversely impacting aircraft performance or flying qualities throughout the flight envelope. Thus, the wing-body load alleviation may provide for large structural weight savings to enable additional cargo, reduced fuel consumption, and/or extended range per flight. The wing-body load alleviation may also be used to reduce fuel burns and reduce the amount of airframe raw materials needed for aircraft construction. Customers will also benefit from the increased airplane performance and efficiency provided by wing-body load alleviation.

Wing-body load alleviation may significantly reduce airplane structural weight due to maneuvering loads with minimal impact on normal operations. For example, wing-body load alleviation does not activate for normal maneuvers encountered during revenue service. The impact on handling qualities is insignificant. In addition, special training of personnel and/or pilots is not required to utilize wing-body load alleviation. The wing-body load alleviation does not require dedicated crew annunciations associated with the wing-body load alleviation and no dedicated hardware is required. Wing-body load alleviation may be implemented using existing hardware sensors and control surfaces.

The different advantageous embodiments can take the form of an entirely software embodiment or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for symmetric and anti-symmetric control of aircraft flight control surfaces to reduce wing-body loads, the computer implemented method comprising:

sending commands to symmetrically deploy outboard control surfaces to shift wing air-loads inboard based on airplane state and speed brake deployment of an aircraft;

limiting surface rate retraction on a wing with peak loads to reduce maximum loads due to wheel checkback accompanied by utilization of opposite wing control surfaces to retain roll characteristics, wherein the wing-body loads are reduced using the symmetric and anti-symmetric control of the aircraft flight control surfaces;

limiting a pilot commanded rate of gravity change for commanded normal acceleration and aircraft rate of gravity change response to acceptable magnitudes such that aircraft actuation systems and signal processing deploys wing-body load alleviation control surfaces in accordance with prescribed schedules;

responsive to initiation of a positive gravity maneuver, shifting airloads inboard on a swept wing to move a center of pressure forward, wherein the tail load required to perform the positive gravity maneuver is reduced;

responsive to initiation of a negative gravity maneuver, retracting speed brakes to reduce the positive tail load and aft body design loads during the negative gravity maneuver; and filtering out high gain feedback commands from wing structural modes above one hertz by a set of linear and non-linear filters.

2. The computer implemented method of claim 1 further comprising:

reducing allowable roll command to reduce airplane steady state and peak roll rate, wherein a pilot is limited on an amount of motion and roll by the aircraft that the pilot can induce.

3. The computer implemented method of claim 1 wherein the symmetric and anti-symmetric control of the aircraft flight control surfaces further comprises:

deploying a set of symmetric trailing edge control surfaces associated with a left wing and a right wing into a scheduled up or down position;

extending ailerons upward or downward;

extending outboard spoilers upward or retracting speed-brake spoilers;

retracting inboard speedbrake spoilers; and extending flaperons upward or downward to provide direct lift.

4. The computer implemented method of claim 1 further comprising:

responsive to identifying a maneuver as a nominally encountered maneuver, de-activating wing-body load alleviation function, wherein the maneuver comprises at least one of nominal maneuvers initiated by a pilot and nominal maneuvers resulting from exogenous disturbances; and activating a wing-body load alleviation function throughout a maneuvering envelope, wherein the maneuvering envelope is greater than a normal maneuvering envelope due to pilot commands or exogenous disturbances, wherein the wing-body load alleviation functions of the control system activate and are transparent to maneuvering and handling qualities of the aircraft.

5. The computer implemented method of claim 1 further comprising:

reconfiguring nominal control laws to counteract pitch and lift disturbances due to extension and retraction of wing mounted control surfaces; and simultaneously providing direct cross-tie between the wing mounted control surfaces and elevator.

6. The computer implemented method of claim 1 further comprising:

responsive to a positive load on a wing, retracting inboard speed brakes associated with the wing to reduce wing and tail loads; and responsive to a negative maneuver load on a wing, retracting both inboard speed brakes and outboard speed brakes associated with the wing to reduce wing and tail loads, wherein wing-body load alleviation provides load relief for load levels up to an ultimate load for both positive and negative gravity maneuver loads on the aircraft.

7. The computer implemented method of claim 1 further comprising:
providing, by a wing-body load alleviation function, load relief for maneuver loads equal to ultimate loads for control surface configurations comprising both flaps down and flaps up configurations.

8. The computer implemented method of claim 1 further comprising:
selecting a maximum between speed brake handle commands issued by a pilot and wing-body load alleviation commands issued by a wing-body load alleviation function to form a max select value; and
extending outboard spoilers using the max select value.

9. The computer implemented method of claim 1 further comprising:
synthesizing a load factor at a center of gravity using inertial reference unit signals to estimate the load factor forward and aft of the wing, wherein the inertial reference unit signals comprises body normal acceleration and body pitch acceleration; and
performing a max select to capture the peak load factor at the center of gravity, wherein the inertial reference unit signals are used as a driver to move the wing mounted surfaces and reconfigure the control laws.

10. The computer implemented method of claim 1 wherein wing-body load alleviation is active during manual pilot operations, auto pilot operations, and autoflight operations.

11. The computer implemented method of claim 1 further comprising:
removing higher frequency signals in the feedback command to the control surfaces by the set of linear filters and non-linear filters, wherein a non-linear filter uses a minimum value or a maximum value of its input for a preceding last second to provide output from the non-linear filter, wherein the high frequency signals are not passed through the filter.

12. The computer implemented method of claim 11 further comprising:
blocking selected frequency signals using a moving time window associated with the set of linear filters and non-linear filters, wherein time is adjusted for a faster response time or blocking higher frequencies, and wherein the time is a function of aircraft state, flight conditions, structural modes frequencies, and aircraft weight.

13. An aircraft, wherein the aircraft comprises:
a wing-body load alleviation control and logic, wherein the wing-body load alleviation control and logic sends commands to symmetrically deploy outboard control surfaces to shift wing air-loads inboard based on airplane state and speed brake deployment of an aircraft; limit surface rate retraction on a wing with peak loads to reduce maximum loads due to wheel checkback accompanied by utilization of opposite wing control surfaces to retain roll characteristics, wherein the wing-body loads are reduced using the symmetric and anti-symmetric control of the aircraft flight control surfaces; the wing-body load alleviation control and logic regulates a pilot commanded rate of change for normal acceleration and aircraft rate of gravity change response to acceptable magnitudes such that aircraft actuation systems and signal processing deploys wing-body load alleviation control surfaces in accordance with prescribed schedules, wherein the wing-body load alleviation control and logic shifts airloads inboard on a swept wing to move a center of pressure forward in response to initiation of a positive gravity maneuver to reduce the tail load required to perform the positive gravity maneuver;
a set of speed-brakes, wherein the wing-body load alleviation control and logic retracts at least one speed brake in the set of speed brakes to reduce the positive tail load and aft body design loads during the negative gravity maneuver in response to initiation of a negative gravity maneuver; and
a set of filters, wherein the set of filters comprises linear and non-linear filters, and wherein the filters filter out high gain commands from wing structural modes above one hertz by a set of linear and non-linear filters.

14. The aircraft of claim 13 further comprising:
a set of control surfaces, wherein the control surfaces comprises a set of inboard spoilers, a set of outboard spoilers, a set of outboard ailerons, and a set of flaperons, and wherein the wing-body load alleviation control and logic retracts inboard spoilers, extends outboard spoilers upwards, extends outboard ailerons upwards, and extends flaperons downward to shift wing airloads inboard during a positive gravity wing load maneuver.

15. An apparatus comprising:
a bus system;
a communications system connected to the bus system;
a memory connected to the bus system, wherein the memory includes computer usable program code; and
a processing unit connected to the bus system, wherein the processing unit executes the computer usable program code to send commands to symmetrically deploy outboard control surfaces to shift wing air-loads inboard based on airplane state and speed brake deployment of an aircraft; limit surface rate retraction on a wing with peak loads to reduce maximum loads due to wheel checkback accompanied by utilization of opposite wing control surfaces to retain roll characteristics, wherein the wing-body loads are reduced using the symmetric and anti-symmetric control of the aircraft flight control surfaces; limit a pilot commanded rate of gravity change for commanded normal acceleration and aircraft rate of gravity change response to acceptable magnitudes such that aircraft actuation systems and signal processing deploys wing-body load alleviation control surfaces in accordance with prescribed schedules; shift airloads inboard on a swept wing to move a center of pressure forward in response to initiation of a positive gravity maneuver, wherein the tail load required to perform the positive gravity maneuver is reduced; retract speed brakes to reduce the positive tail load and aft body design loads during the negative gravity maneuver in response to initiation of a negative gravity maneuver; and filter out high gain feedback commands from wing structural modes above one hertz by a set of linear and non-linear filters.

16. The apparatus of claim 15 wherein the processor unit further executes the computer usable program code to de-activate wing-body load alleviation function in response to identifying a maneuver as a nominally encountered maneuver, wherein the maneuver comprises maneuvers initiated by a pilot and maneuvers resulting from exogenous disturbances; and activate a wing-body load alleviation function when exceeding the nominal maneuvering envelope such that wing-body load alleviation functions of the control system are substantially transparent to maneuvering and handling qualities of the aircraft.

17. The apparatus of claim 15 wherein the processor unit further executes the computer usable program code to retract inboard speed brakes associated with the wing to reduce wing and tail loads in response to a positive load on a wing; and retract both inboard speed brakes and outboard speed brakes associated with the wing to reduce wing and tail loads in response to a negative maneuver load on a wing, wherein wing-body load alleviation provides load relief for up to and inclusive ultimate loads for both positive and negative gravity maneuver loads on the aircraft.

18. The apparatus of claim 15 wherein the processor unit further executes the computer usable program code to reconfigure nominal control laws to counteract pitch and lift disturbances due to extension and retraction of wing mounted control surfaces; and simultaneously provide direct cross-tie between the wing mounted control surfaces and elevator.

19. The apparatus of claim 15 wherein the processor unit further executes the computer usable program code to reduce allowable roll command to reduce airplane steady state and peak roll rate, wherein a pilot is limited on an amount of motion and roll by the aircraft that the pilot can induce.

20. The apparatus of claim 15 wherein the processor unit further executes the computer usable program code to deploy a set of symmetric trailing edge control surfaces associated with a left wing and a right wing into a scheduled up or down position; extend ailerons upward or downward; extend outboard spoilers upward or retracting speedbrake spoilers; retract inboard speedbrake spoilers; and extend flaperons upward or downward to provide direct lift.

\* \* \* \* \*